US011468050B2

(12) United States Patent
Ackermann et al.

(10) Patent No.: US 11,468,050 B2
(45) Date of Patent: Oct. 11, 2022

(54) LEARNING USER SYNONYMS FROM SEQUENCED QUERY SESSIONS

(71) Applicant: International Business Machines Corporation, Armonk, NY (US)

(72) Inventors: Christopher F. Ackermann, Fairfax, VA (US); Charles E. Beller, Baltimore, MD (US); Stephen A. Boxwell, Columbus, OH (US); Edward G. Katz, Washington, DC (US); Kristen M. Summers, Takoma Park, MD (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 15/827,400

(22) Filed: Nov. 30, 2017

(65) Prior Publication Data

US 2019/0163781 A1     May 30, 2019

(51) Int. Cl.
*G06F 16/00*     (2019.01)
*G06F 16/242*     (2019.01)
(Continued)

(52) U.S. Cl.
CPC .... *G06F 16/2425* (2019.01); *G06F 16/24578* (2019.01); *G06F 16/9535* (2019.01); *G06F 40/242* (2020.01); *G06F 40/247* (2020.01)

(58) Field of Classification Search
CPC ............. G06F 16/2425; G06F 16/9535; G06F 16/24578; G06F 17/2735; G06F 17/2795
(Continued)

(56) References Cited

U.S. PATENT DOCUMENTS

| 6,078,917 A * | 6/2000 | Paulsen, Jr. ......... G06F 16/3346 |
| | | 707/999.005 |
| 7,231,379 B2 * | 6/2007 | Parikh ................... G06F 16/322 |

(Continued)

FOREIGN PATENT DOCUMENTS

| WO | 2012/016194 A1 | 2/2012 |
| WO | 2013/078651 A1 | 6/2013 |
| WO | 2015/036817 A1 | 3/2015 |

OTHER PUBLICATIONS

Sun et al., "A WordNet-Based Near-Synonyms and Similar-Looking Word Learning System," Educational Technology & Society, 2011, 14 (1), pp. 121-134.
(Continued)

*Primary Examiner* — Monica M Pyo
(74) *Attorney, Agent, or Firm* — Nathan M. Rau

(57) ABSTRACT

A system and a method for determining user synonyms in a query processing system is disclosed. A first query is received from a user of the query processing system. The query is processed through the query processing system to generate results for the first query. The user then provides a second query. The system determines a contextual similarity between the first query and the second query. When the first query and the second query are determined to be contextually similar, a first term is identified in the first query that is different from a second term in the second query. Once identified, the system determines if the first term and the second term are not listed as synonyms in the thesaurus. If they are not listed as synonyms they can be added as synonyms to the thesaurus.

20 Claims, 6 Drawing Sheets

(51) Int. Cl.
*G06F 16/9535* (2019.01)
*G06F 16/2457* (2019.01)
*G06F 40/242* (2020.01)
*G06F 40/247* (2020.01)

(58) Field of Classification Search
USPC .......................................................... 707/769
See application file for complete search history.

(56) References Cited

U.S. PATENT DOCUMENTS

| | | | |
|---|---|---|---|
| 8,014,997 B2* | 9/2011 | Huang | G06F 16/3338 |
| | | | 704/7 |
| 8,447,702 B2* | 5/2013 | Nicks | G06F 16/90335 |
| | | | 707/769 |
| 9,141,728 B2* | 9/2015 | Loritz | G06F 16/90332 |
| 9,323,811 B2 | 4/2016 | Hasan et al. | |
| 9,430,584 B2 | 8/2016 | Wang et al. | |
| 10,685,047 B1* | 6/2020 | Patnaik | G06F 16/334 |
| 2004/0054662 A1* | 3/2004 | Dworkis | G06F 16/338 |
| 2004/0139106 A1* | 7/2004 | Bachman | G06F 16/951 |
| 2004/0139107 A1* | 7/2004 | Bachman | G06F 16/951 |
| 2004/0243568 A1 | 12/2004 | Wang et al. | |
| 2006/0224554 A1* | 10/2006 | Bailey | G06F 16/3322 |
| 2009/0094196 A1* | 4/2009 | Piwowarski | G06F 16/954 |
| 2009/0216691 A1* | 8/2009 | Borzestowski | G06F 16/3332 |
| | | | 706/11 |
| 2009/0287669 A1* | 11/2009 | Bennett | G06F 16/58 |
| 2010/0191760 A1* | 7/2010 | Kusumura | G06F 16/258 |
| | | | 707/760 |
| 2010/0198821 A1* | 8/2010 | Loritz | G06F 17/2795 |
| | | | 707/728 |
| 2010/0274618 A1* | 10/2010 | Byrd | G06Q 10/10 |
| | | | 704/275 |
| 2010/0293242 A1* | 11/2010 | Buchheit | H04L 51/16 |
| | | | 707/769 |
| 2013/0173573 A1* | 7/2013 | Song | G06F 16/951 |
| | | | 707/706 |
| 2014/0129584 A1* | 5/2014 | Maple | H04L 67/16 |
| | | | 707/760 |
| 2015/0081656 A1 | 3/2015 | Wang et al. | |
| 2016/0103873 A1* | 4/2016 | Allen | G06F 40/30 |
| | | | 704/9 |
| 2016/0147875 A1 | 5/2016 | Adderly et al. | |
| 2016/0217521 A1 | 7/2016 | Hasan et al. | |
| 2017/0193020 A1* | 7/2017 | Yi | G06F 16/2455 |
| 2018/0268071 A1* | 9/2018 | Even-Zohar | G06F 16/9535 |
| 2019/0163768 A1* | 5/2019 | Gulati | G06F 16/9535 |

OTHER PUBLICATIONS

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

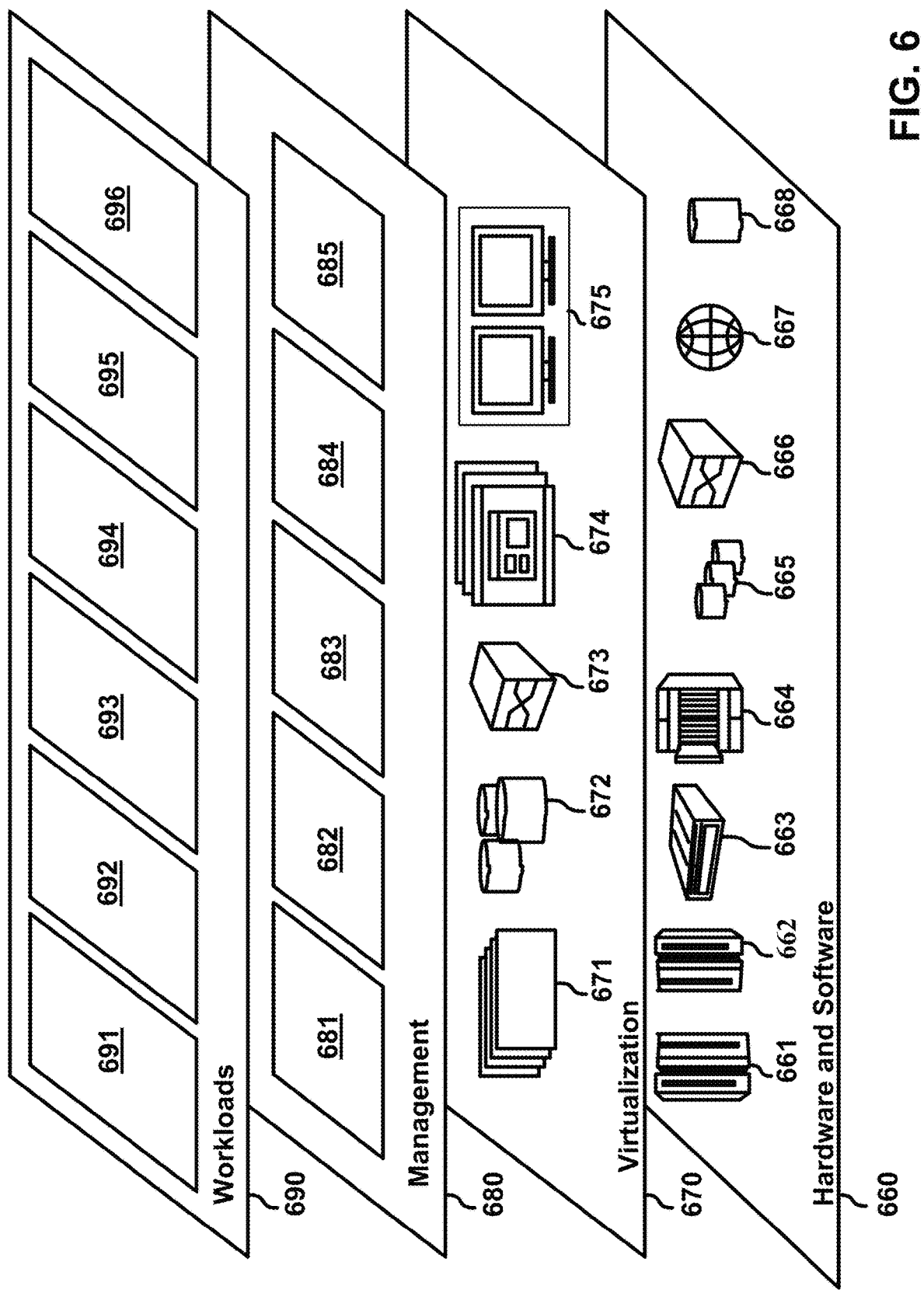

LEARNING USER SYNONYMS FROM SEQUENCED QUERY SESSIONS

BACKGROUND

The present disclosure relates to present disclosure relate to searching knowledge bases, more specifically to learning user specific synonyms from search queries.

Search engines, such as Google and Bing have been optimized to provide relevant results to users based for a given search query. The techniques used by these search engines rely on text based matching of the terms to documents (sites) within their knowledge base. Some search engines expand the base search by applying techniques such as spell correction or changing the order of terms to enable enhanced recognition. Some search engines employ a thesaurus to provide synonyms which can be added to the further expand the search terms. However, it is challenging to maintain client specific synonym resources. Specifically, entities of interest rapidly change and can have multiple synonyms from variant of spelling to completely opaque aliases and nicknames.

SUMMARY

According to embodiments of the present disclosure, a system and a method for determining user synonyms in a query processing system is disclosed. A first query is received from a user of the query processing system. The query is processed through the query processing system to generate results for the first query. The user then provides a second query. The system determines a contextual similarity between the first query and the second query. When the first query and the second query are determined to be contextually similar, a first term is identified in the first query that is different from a second term in the second query. Once identified, the system determines if the first term and the second term are not listed as synonyms in the thesaurus. If they are not listed as synonyms they can be added as synonyms to the thesaurus.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 6 illustrates a set of functional abstraction layers provided by cloud computing environment according to one illustrative embodiment.

Figure 1:
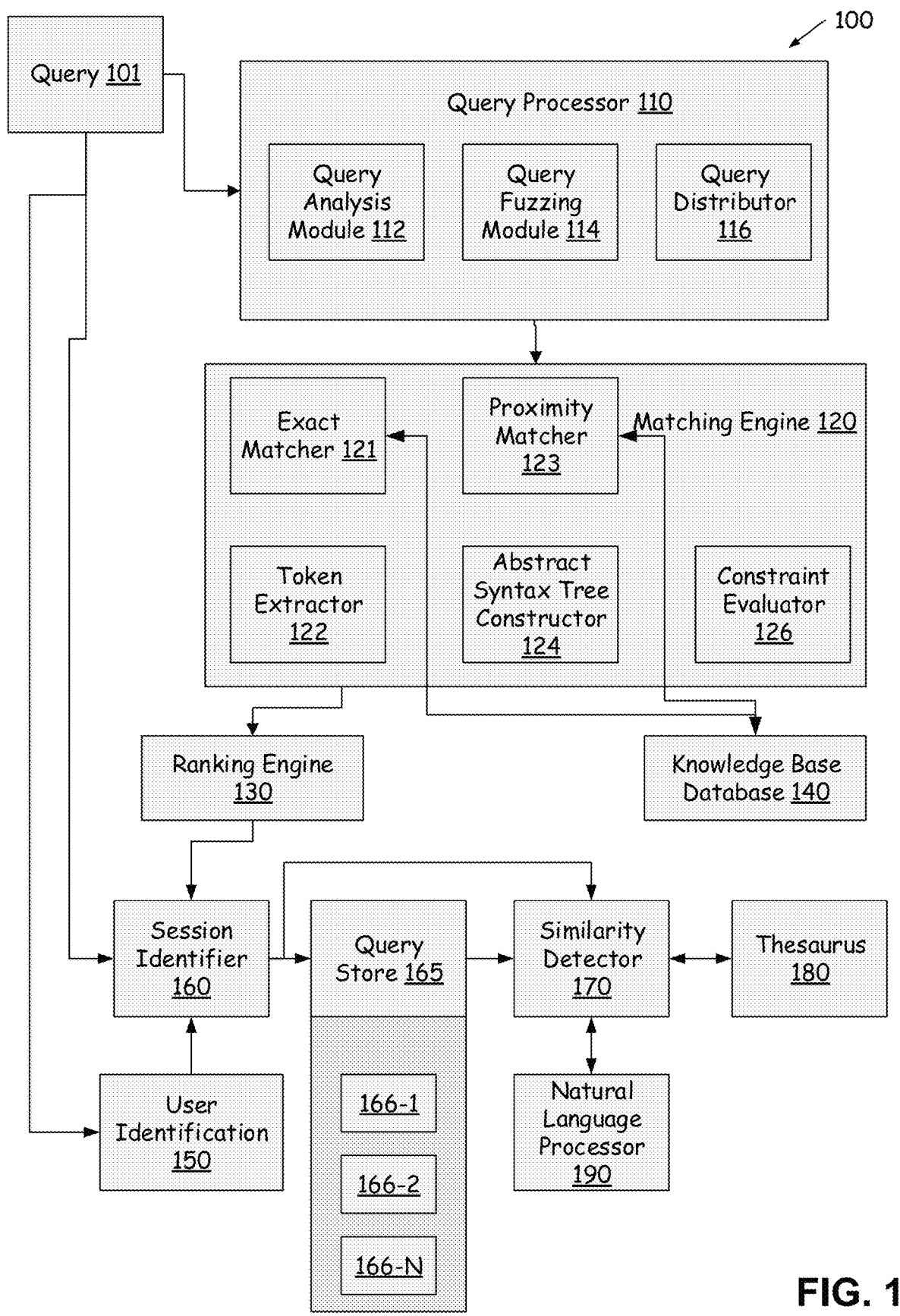
FIG. 1 is a block diagram illustrating the components of a query processing system that includes synonym additions based on user queries, according to illustrative embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to searching knowledge bases, more particular aspects relate to learning synonyms for terms on a user by user basis. While the present disclosure is not necessarily limited to such applications, various aspects of the disclosure may be appreciated through a discussion of various examples using this context.

Search engines, such as Google and Bing have been optimized to provide relevant results to users based for a given search query. The techniques used by these search engines rely on text based matching of the terms to documents (sites) within their knowledge base. Some search engines expand the base search by applying techniques such as spell correction or changing the order of terms to enable enhanced recognition. Some search engines employ a thesaurus to provide synonyms which can be added to the further expand the search terms. However, it is challenging to maintain client specific synonym resources. Specifically, entities of interest rapidly change and can have multiple synonyms from variant of spelling to completely opaque aliases and nicknames. The present discussion provides a solution to the client specific synonym problem by identifying these synonyms and adding them to the thesaurus based on the user providing a series of similar queries that contain the unknown synonyms.

FIG. 1 is a block diagram illustrating the components of a query processing system 100 that includes synonym additions based on user queries, according to illustrative embodiments. Query processing system 100 includes, a query processor 110, a matching engine 120, a ranking engine 130, a knowledge base 140, a user identification component 150, a session identification component 160, a similarity detector 170, a thesaurus 180, and a natural language processor 190.

Query processor 110 is configured to receive the input query 101 and convert the received query into a format that permits the query to be matched against documents stored in an enhanced index or other type of index in the knowledge base 140. Query 101 typically is a query that is directly input to the system 100 by a user by for example typing in a question into a search box. In order to ensure an accurate match of documents in the knowledge base 140 the query processor 110, in one illustrative embodiment, includes three components, a query analysis module 112, a query fuzzing module 114 and a query distributor module 116.

Query analysis module 112 is configured to prepare an abstract representation of the query. It does this by rewriting the query, and substituting any value-types it finds (e.g., numbers like 7 or seven, Boolean words like true or false) with generics (e.g., NUMERIC and BOOLEAN, respectively) and stores the value separately for constraint evaluation by the matching engine 120.

The query fuzzing module 114 is configured to construct a power set of terms in the input query 101 that facilitates approximate searches so that documents may be matched that only contain a subset of the terms from the input query as opposed to the complete input query. For many queries, using exact keywords may not return a result. For instance, a naive search for an input query "Winter snow storm in Minnesota" would return only documents containing all the terms from the input query but it will not return documents where, for instance, the word "snow" is missing. As such the query fuzzing module 114 constructs approximate queries from the original query 101. Any approach for fuzzing can be used.

For an input query such as "Winter snow storm in Minnesota", an exact search or even an approximate search may not return documents containing the text "The winter storm arrived in Minnesota on October 31 bringing significant snow" due to the presence of additional words between the terms from the input query. In such scenarios, it useful to do relaxed queries that allow for other terms to appear in between the input query terms. Query distributor module 116 address this issue by modularizing the matching logic. In one illustrative embodiment the query distributor module 116 is configured to perform a parallel invocation of different matchers in the matching engine 120 (e.g., exact matching, proximity matching) and finally aggregates the results.

The matching engine 120 is configured in one embodiment to implement two types of matchers, an exact matcher 121 and a proximity matcher 123. However, other types of matchers may be present in matching engine 120. These matchers may perform different types of document matching or may simply invoke execution using different guidelines of the existing matchers. In some embodiments the matching engine 120 may distribute the various matchers across multiple different machines.

When matching engine is implementing an exact match, it is implementing a naive search mechanism that looks for documents in the knowledge base database 140 that contain the key-value pairs in their exact form. When the matching engine 120 is implementing a proximity match it is implementing proximity based approximate matching along with a constraint evaluation module as a mechanism to find two tokens within a given proximity of one another that satisfy a constraint (if any). Proximity matching is executed in two stages according to one embodiment.

The first stage is the retrieval stage. For an input query 101, the matching engine 120 not only retrieves the relevant documents but also tracks the positions of every term occurrence that matches from the index. An additional pruning stage removes all matches which are beyond a specified distance. The second stage is the constraint evaluation stage. Once the relevant documents are retrieved along with the set of words between the matched positions of the input query terms, the matching engine 120 performs an on-the-fly truth condition evaluation. First, each match is passed through a token extractor module 122 which extracts any comparative expressions in natural text (e.g., less than or equal to, set to, greater than) along with any surrounding values (e.g., numerical, boolean, floating point etc.). Second, the extracted tokens and surrounding values are passed through an abstract syntax tree constructor 124. The abstract syntax tree construction constructs an abstract syntax tree (AST) for individual expressions to be evaluated. Therefore, the abstract syntax tree will be constructed with the operator as the root node and the operands (value extracted from the query and value from the retrieved document) as the leaf nodes. Third, the abstract syntax trees are compiled in-memory and evaluated to obtain the truth condition through the user of a constraint evaluator 126. Only matches satisfying the specified condition (e.g., truth condition) are returned for subsequent ranking by the ranking engine 130.

Ranking engine 130 is configured to score and rank candidate knowledge base articles that have been retrieved by the matching engine 120. The score of a knowledge base article depends on the matcher that retrieved the knowledge base article. Because there can be multiple matchers, ranking happens at multiple stages.

Knowledge base 140 is in one embodiment a database or other data repository that stores articles or documents along-with any associated meta-data or index related to a specified knowledge base. Knowledge base 140 can be any corpus of data that can be queried, such as the internet, a domain specific knowledge base, a social network, etc.

User identification component 150 is a component of the system configured to identify specific users of the system. Individual users can be identified by, for example, the IP address from where the series of queries come from. In some embodiments, users are identified based on a login or other registration method used by the search engine. (e.g. Facebook ID, Google ID, Yahoo! ID, Microsoft ID, etc). The user identification component 150 is further configured to determine a confidence level in the queries provided by each user of the system. The user identification component 150 determines a relative seriousness of the searches conducted by the corresponding user based on the user having a threshold or predetermined number of interactions with the system 100. This approach filters out those users who are simply entering in a variety of searches without any real intent to find specific information. This also filters out users who are only occasionally using the service. To determine whether a user is acceptable for use in the synonym learning process, the user must have at least N sessions of M interactions with the search engine. In some embodiments N is 10 sessions and M is 10 interactions. However, the values of N and M can be adjusted or selected by the system or an administrator (or other user) based on the desired selectivity. In some embodiments, a user is determined to be an acceptable user based on an independent identification. Independent identification can be done for example, using a machine learning technique, or receiving a list from an authority identifying users. However, any approach can be used to identify these users. In some embodiments, users are selected based on the completion of ability evaluation task. This task can be presented to users at the beginning of a session, and may ask the user to generate a series of searches wherein the user is asked to provide the synonyms for a particular portion of the search term. That is the user is expected to enter multiple different versions of the same search by substituting out one term with a synonym for that term. The synonyms that are monitored are known synonyms for the expected terms. In this way, the system can learn that the user is skilled in identifying synonyms for terms, and is therefore, a skilled user whose data can be used to learn new synonyms. This task can be presented to the user explicitly, or may simply run in the background during the monitoring of the user's interactions with the system.

Session identification component 160 is a component of the system that is configured to identify contiguous use sessions for users. The session identification component 160 can monitor the user interactions for users identified by the user identification component 150. Specifically, the session identification component 160 is monitoring the system for successive interaction by the identified user over a specific period of time. That is queries received within a threshold period of time. This period of time is used as it is indicative that the user has not found what they were looking for in a previous query. In some embodiments, queries that are submitted within 60 seconds of each other are considered to be contiguous queries. However, anytime period can be used as a threshold for successive queries. Though it should be noted that the longer the time period between queries the less likely the queries are related to each other, and therefore, should not be considered part of the same contiguous query session. In some embodiments, the time period includes a lower time limit. A lower time limit can be provided as a filter to filter out searches that the user immediately recognizes as being a wrong search. This can happen when the user, for example, fails to complete the intended query before submitting the query, recognizes a typo in the query, or realizes they entered in the wrong query. A lower limit can be set at, for example 10 seconds. In some embodiments, the time period is based on a response to the results of a particular query. That is the user may enter in the query, and receive results of the query. The user then proceeds to view one or more of the results of the query. After reviewing the results, the user then returns, and enters a new query. If the new query is entered within a short time period following the review of the results this may be indicative that the user has not found the information that they were looking for, and the query is related to the previous query. For example, the system may consider a new query entered within 60 seconds of returning from a result to be a contiguous query. However, anytime period may be used. Again, the longer the time period is the less like the particular query is likely to be related to the previous query.

The session identification component 160 identifies the set of queries that are part of the same session, and stores these queries in a query store as a contiguous query session. The query store 165 holds a number of contiguous query sessions 166-1. 166-2 . . . 166-N, along with the associated queries that comprise the query session and the associated user that generated the session. The contiguous query session may also include information on the order in which the particular queries were entered by the user. The query store can store the query sessions in any format that allows for the associated data to be retrieved.

The similarity detector 170 is a component of the system that is configured to determine the similarity between queries in the contiguous query session. The similarity detector 170 retrieves the queries for the query store. However, in some embodiments the similarity detector 170 receives the contiguous query session directly from the session identifier. The similarity detector 170 provides the queries in the contiguous query session to the natural language processor for processing. The similarity detector 170 takes the results from the natural language processor, and determines, based on the results, if two queries are contextually similar. That is the two queries are looking for the same type of information. For example, "Where does Charles Beller live" and "where does Charlie Beller live" would be considered contextually similar as both are looking for where an individual lives. Likewise, "Where does Suzy Smith live" would also be considered contextually similar. Queries that are determined not to be contextually similar are disregarded for further analysis by the similarity detector 170.

The similarity detector 170 is further configured to determine the differences between two queries that are determined to be contextually the same. That is the similarity detector 170 determines what specifically is different between the two contextually similar queries. For example, the similarity detector 170 would determine that in the queries "Where does Charles Beller live" and "where does Charlie Beller live" that the difference between the two queries is "Charles" and "Charlie". Any process for identifying the differences can be used. The similarity detector 170 then compares the determined difference between the query with known synonyms contained in a thesaurus 180.

The thesaurus 180 is a component of the system that contains a list of known synonyms for various words or ideas. The thesaurus 180 maintains a database or other structure of word pairs that indicate that words are related to each other. For example, the thesaurus 180 would have a word pair of "ship:boat" and "boat:ship" representing that these words can be substituted for one another in expanding a query. It should be noted that any thesaurus 180 can be used by the system.

When the thesaurus 180 does not contain a word pair for the difference between the two queries, the similarity detector 170, in some embodiments, performs one last analysis on the difference to determine if the differences are not known to be dissimilar. That is if the queries were "Where does Charles Beller live" and "where does Suzy Smith live", the similarity detector 170 would analyze if "Charles" and "Suzy" were known to be dissimilar to each other. The similarity detector 170 may, for example, pass these words back to the natural language processor to obtain additional information about the particular terms, if information related to the terms was not specifically provided back to the similarity detector 170. In another approach, the similarity detector 170 can determine how many characters are different between the two terms and compare that difference against a threshold difference. The similarity detector 170 can analyze the term to see where the terms start to diverge from one another. The terms can be determined to be similar if a threshold number of initial characters are the same. In another approach the terms are compared to a large corpus of documents and are compared to determine if they are used in similar ways. This comparison can be done at multiple levels of granularity, such as on a sentence, paragraph, sliding window of words, etc. If the words are determined to be similar using one of these approaches, the similarity detector 170 determines that the words are synonyms for each other. In some embodiments, the similarity detector asks the user if the words are synonyms of each other. This can be done, for example, by presenting the identified terms on a display device, and waiting for the user to confirm or deny the terms as synonyms. Once the terms have been identified as synonyms the similarity detector 170 then adds these terms to the thesaurus 180 as synonyms for each other, but does so only for the particular user. Thus, the thesaurus 180 is modified such that it becomes a user specific thesaurus. In some embodiments the user specific thesaurus 180 is maintained as separate thesaurus for the user, and is consulted or used by the query system when that particular user provides input queries to the system.

The natural language processor 190 is a component of the system that is configured to extract, parse, analyze, and process the data from the contiguous query sessions. For example, the natural language processor 190 can be configured to structure data (e.g., convert data into plaintext) in the repositories, and complete various analyses (e.g., semantic analysis, lexical analysis, part of speech (POS) tagging, syntactic analysis, personal name recognition, etc.) of the structured data. In some embodiments, the natural language processor 190 processes the structured data into a form convenient for comparison to other processed data (e.g., formats the data in a particular manner). This enables the similarity detector 170 to determine whether two queries in the contiguous query session are contextually related.

Figure 2:
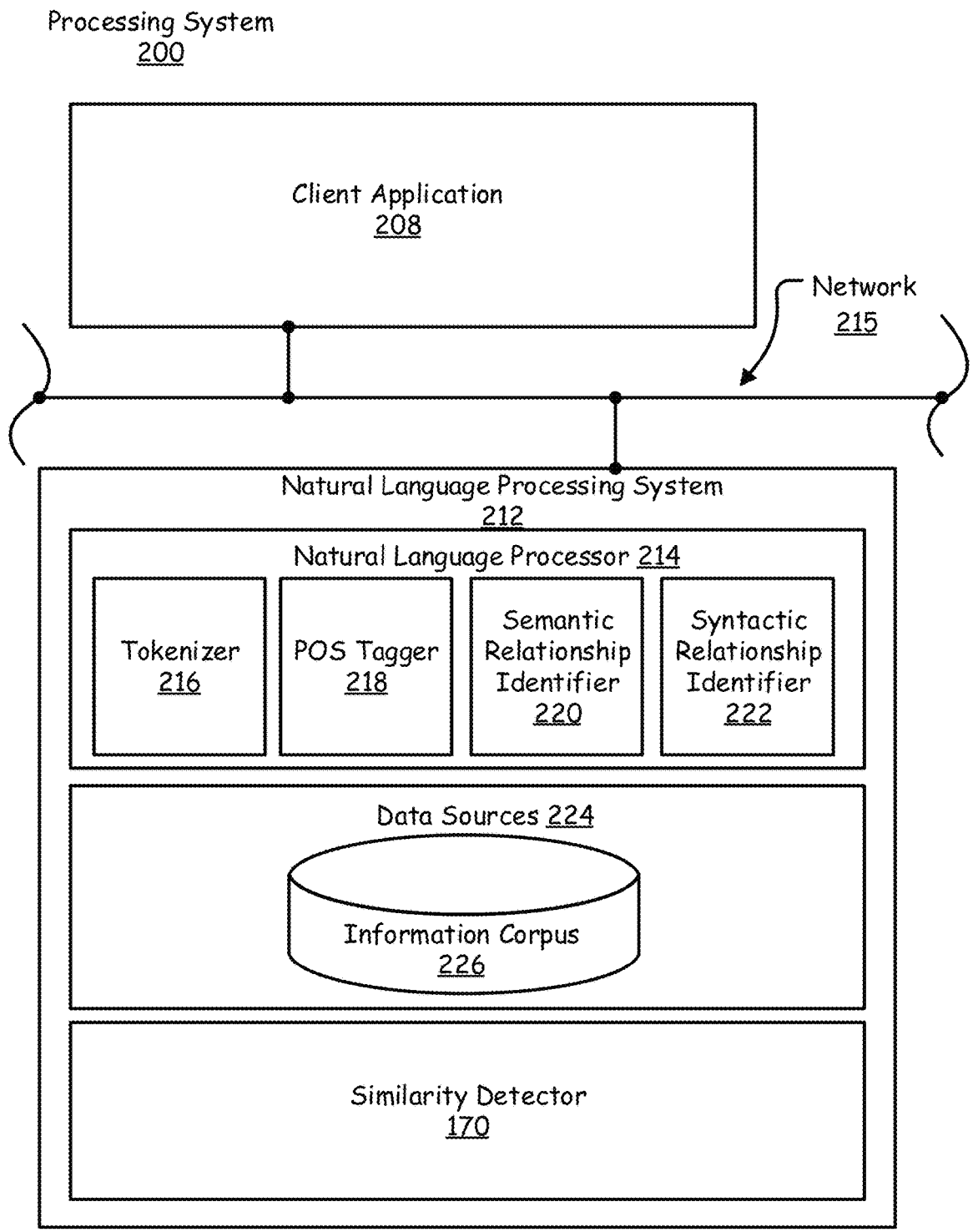
FIG. 2 is a block diagram of an example natural language processing system according to an illustrative embodiment.

Turning now to FIG. 2, illustrated is a block diagram of an example natural language processing system 200 configured to process unstructured data inputs (e.g., unstructured text documents, queries, etc), in accordance with embodiments of the present disclosure. In some embodiments, the similarity detector 170 submits input data (e.g. queries in a contiguous query session) to be analyzed by the natural language processing system 212, which can be a standalone device, or part of a larger computer system. Such a processing system 200 can include a client application 208 (e.g. search engine, or similarity detector 170), which can itself involve one or more entities operable to generate or modify unstructured input data that is then dispatched to a natural language processing system 212 via a network 215.

Consistent with various embodiments, the natural language processing system 212 responds to electronic submissions sent by the client application 208. Specifically, the natural language processing system 212 analyzes a received unstructured data input (e.g., queries within the contiguous query session) and prepares the unstructured data input for comparison to other data. The natural language processing system 212 includes a natural language processor 214, data sources 224, and similarity detector 170.

The natural language processor 214 (e.g., natural language processor 190 of FIG. 1) can be a computer module that analyzes the received unstructured input data from data sources 224. The data sources 224 can, in some embodiments, be the query sessions. In some embodiments, the data sources 224 can include an information corpus 226. The information corpus 226 can enable data storage and retrieval. In some embodiments, the information corpus 226 may be a storage mechanism that houses a standardized, consistent, clean, and integrated list of data, such as queries that have been arranged subject to data quality or data hygiene systems or rules.

The natural language processor 214 can perform various methods and techniques for analyzing electronic documents (e.g., syntactic analysis, semantic analysis, personal name recognition, etc.). The natural language processor 214 can be configured to recognize and analyze any number of natural languages. In some embodiments, the natural language processor 214 can parse passages of the documents (e.g., queries). Further, the natural language processor 214 can include various modules to perform analyses of electronic documents. These modules can include, but are not limited to, a tokenizer 216, a part-of-speech (POS) tagger 218, a semantic relationship identifier 220, and a syntactic relationship identifier 222.

In some embodiments, the tokenizer 216 can be a computer module that performs lexical analysis. The tokenizer 216 can convert a sequence of characters into a sequence of tokens. A token can be a string of characters included in an electronic input document and categorized as a meaningful symbol. Further, in some embodiments, the tokenizer 216 can identify word boundaries in an electronic document and can break any text passages within the document into their component text elements, such as words, multiword tokens, numbers, and punctuation marks. In some embodiments, the tokenizer 216 can receive a string of characters, identify the lexemes in the string, and categorize them into tokens.

Consistent with various embodiments, the POS tagger 218 can be a computer module that marks up a word in passages to correspond to a particular part of speech. The POS tagger 218 can ingest a passage or other text in natural language and assign a part of speech to each word or other token. The POS tagger 218 can determine the part of speech to which a word (or other text element) corresponds, based on the definition of the word and the context of the word. The context of a word can be based on its relationship with adjacent and related words in a phrase, sentence, or paragraph. In some embodiments, the context of a word can be dependent on one or more previously analyzed data inputs (e.g., the context of a word in a dictionary can describe or bring further meaning to a word or phrase in an encyclopedia). In embodiments, the output of the natural language processing system 212 can populate a text index, a triple-store, or a relational database (RDB) to enhance the contextual interpretation of a word or term. Examples of parts of speech that can be assigned to words include, but are not limited to, nouns, verbs, adjectives, adverbs, and the like. Examples of other part of speech categories that POS tagger 218 can assign include, but are not limited to, comparative or superlative adverbs, wh-adverbs, conjunctions, determiners, negative particles, possessive markers, prepositions, wh-pronouns, and the like. In some embodiments, the POS tagger 218 can tag or otherwise annotate tokens of a passage with part of speech categories. In some embodiments, the POS tagger 218 can tag tokens or words of a passage to be parsed by the natural language processing system 212.

In some embodiments, the semantic relationship identifier 220 can be a computer module that can be configured to identify semantic relationships of recognized text elements (e.g., words, phrases) in documents. In some embodiments, the semantic relationship identifier 220 can determine functional dependencies between entities and other semantic relationships.

Consistent with various embodiments, the syntactic relationship identifier 222 can be a computer module that can be configured to identify syntactic relationships in a passage composed of tokens. The syntactic relationship identifier 222 can determine the grammatical structure of sentences such as, for example, which groups of words are associated as phrases and which word is the subject or object of a verb. The syntactic relationship identifier 222 can conform to formal grammar.

In some embodiments, the natural language processor 214 can include a personal name recognition component that can search, analyze, and compare multicultural name data sets by applying culture-specific name data and linguistic rules that are associated with the name's culture. The name recognition component can ingest tokenized text data or recognized text elements, can recognize potential personal names and parse them into surname and given name components, and can generate variations of personal names, including common or user-suggested nicknames, for comparison. The name recognition component can match names based on both pronunciation and orthography, associating the closeness of the matches with scores.

In some embodiments, the natural language processor 214 can be a computer module that can parse a document and generate corresponding data structures for one or more portions of the document. For example, in response to receiving an unstructured textual report at the natural language processing system 212, the natural language processor 214 can output parsed text elements from the report as data structures. In some embodiments, a parsed text element can be represented in the form of a parse tree or other graph structure. To generate the parsed text element, the natural language processor 214 can trigger computer modules 216-222.

The output of natural language processor 214 can be used by the similarity detector 170 to determine that two queries are substantially similar in context to each other. That is the output of the natural language processor allows the similarity detector 170 to know that the query "Where does Charles Beller live" is similar to the queries "Where does Charlie Beller live", "Where does Charles Beller reside," and "Where does Suzy Smith live" in that all of these queries are looking for where does an individual live/reside. Likewise, the output of the natural language processor 214 is used by the similarity detector 170 to determine that two queries in the contiguous query session are not substantially similar to each other. That is the output of the natural language processor 214 allows the similarity detector 170 to know that the query "Where does Charles Beller live" and the query "What car does Charles Beller drive" are not contextually similar.

Figure 3:
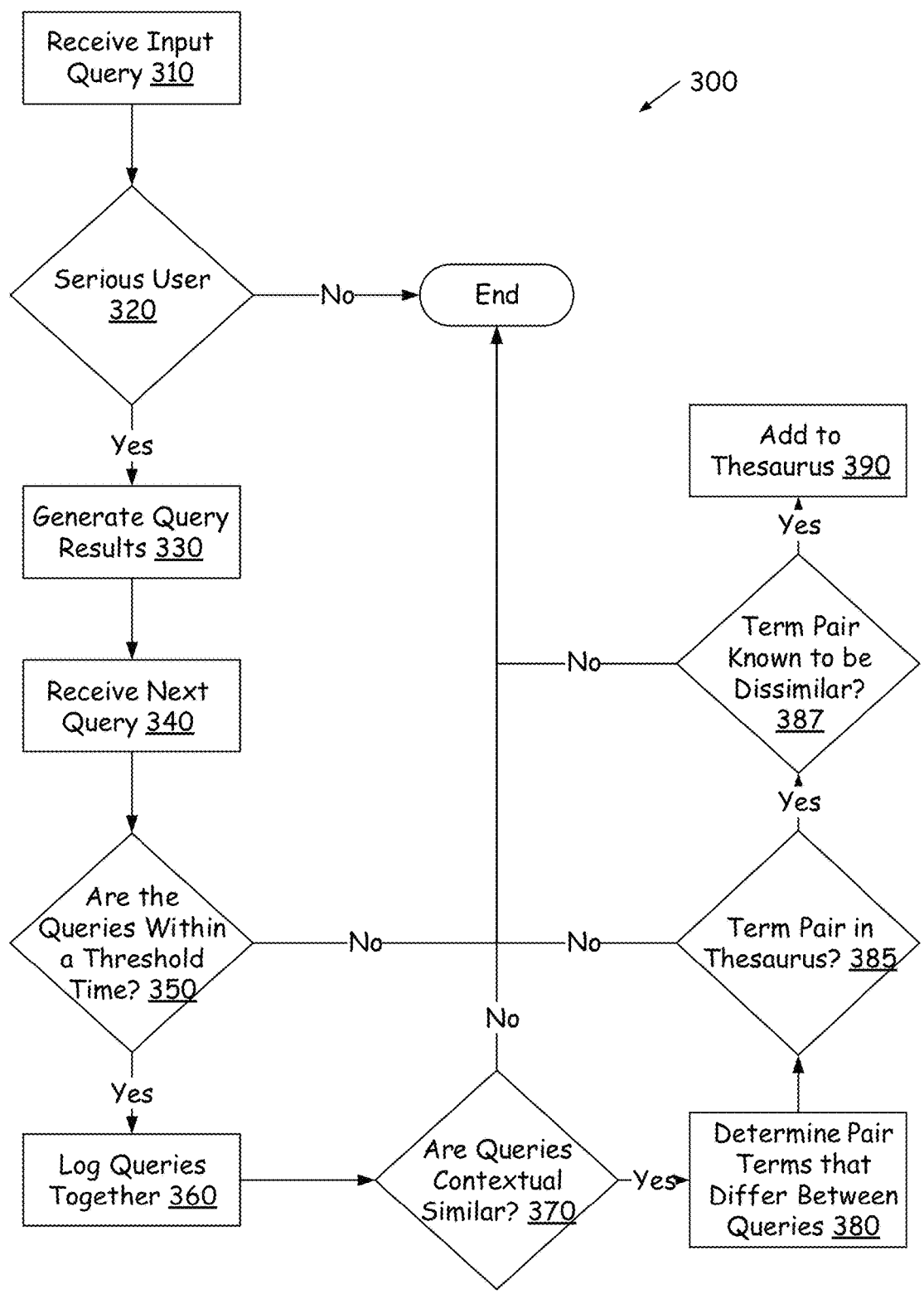
FIG. 3 is a flow diagram illustrating a process for identifying user specific synonyms from queries according to embodiments.

FIG. 3 is a flow diagram illustrating a process 300 for identifying user specific synonyms from queries according to embodiments.

The process begins when a user provides a query to the query processing system. This is illustrated at step 310. In one embodiment, the user types in a question into a search box. However, any method for providing an input query can be used, such as automatic generation, system logs, etc.

Once the first query has been entered a seriousness of the user is determined. This is illustrated at step 320. To determine whether a user is acceptable for use in the synonym learning process, the user must have at least N sessions of M interactions with the search engine. In some embodiments N is 10 sessions and M is 10 interactions. However, the values of N and M can be adjusted or selected by the system or an administrator (or other user) based on the desired selectivity. In some embodiments, a user is determined to be an acceptable user based on an independent identification. Independent identification can be done for example, using a machine learning technique, or receiving a list from an authority identifying users. However, any approach can be used to identify these users. In some embodiments, users are selected based on the completion of ability evaluation task.

If the user is determined not to be a serious user, the process terminates until such time as the user is determined to be serious user. However, if the user is determined to be a serious user, the process continues to step 330.

The input query is processed through the query processing system to generate a number of search results that are output to the user. This is illustrated at step 330. In some embodiments documents who have a calculated score below a threshold number may be excluded from the results that are displayed. In other embodiments x (e.g., top-50) number of documents will be returned to the user regardless of the number of documents that were returned. The results are displayed to the user on a display device or other display means. The returned list of results, can include, a corresponding link that allows the user to interact with the result to view or navigate to the underlying document associated with the result. In some embodiments, the results include a brief summary of the underlying document indicating to the user why the document was included in the results.

Following the review of the results the user provides a second (or subsequent) query to the query processing system. This is illustrated at step 340. Again to enter the second query, the user can type in a question into a search box. However, any method for providing an input query can be used, such as automatic generation, system logs, etc. And the process moves to step 350

At step 350 the contiguousness of the timing between the first query and the second query is determined. The session identification component 160 determines whether the first query and the second query were entered prior to the expiration of a threshold period of time. If the second query is entered prior to the expiration of the threshold period of time then the two queries are considered contiguous. In some embodiments, queries that are submitted within 60 seconds of each other are considered to be contiguous queries. However, anytime period can be used for successive queries. In some embodiments, the time period includes a lower time limit. A lower time limit can be provided as an additional filter to filter out searches that the user immediately recognizes as being a wrong search. This can happen when the user, for example, fails to complete the intended query before submitting the query, recognizes a typo in the query, or realizes they entered in the wrong query. A lower limit can be set at, for example 10 seconds. In some embodiments, the time period is based on a response to the results of a particular query. That is the user may enter in the query, and receive results of the query. The user then proceeds to view one or more of the results of the query. After reviewing the results, the user then returns, and enters a new query. For example, the system may consider a new query entered within 60 seconds of returning from a result to be a contiguous query. However, anytime period may be used. The process then returns to step 330 to display new results based on the second or subsequent query. Steps 340 and 350 are repeated until such time as the next entered query is not considered contiguous.

Each query in the contiguous query is logged and stored. This is illustrated at step 360. The logged queries form a contiguous query session. This contiguous query session is stored in the query store. The query store holds a number of contiguous query sessions, along with the associated queries that comprise the query session and the associated user that generated the session. The contiguous query session may also include information on the order in which the particular queries were entered by the user.

Next the contiguous query session is analyzed to determine the similarity between particular queries in the session. This is illustrated at step 370. Each query is provided to a natural language processor to determine if the queries are looking for the same type of information. That is each query is analyzed to determine if the query is contextual similar to another query in the session. If the queries are not determined to be contextually similar the process ends.

However, if the queries are determined to be contextually similar the process 300 proceeds to determine the differences between specific term pairs in the similar queries. This is illustrated at step 380. At this step the process determines what specifically is different between the two contextually similar queries. For example, step 380 would determine that in the queries "Where does Charles Beller live" and "where does Charlie Beller live" that the difference between the two queries is the term pair "Charles" and "Charlie". Any process for identifying the differences can be used. The determined difference in the term pairs is then compared with known synonyms contained in a thesaurus 180. This is illustrated at step 385. If the term pair is found in the thesaurus 180, then the process terminates. However, if the term pair is not found in the thesaurus 180, the two terms are added to a user specific thesaurus 180 of user synonyms. This is illustrated at step 390. In some embodiments prior to adding the term pair to the user specific thesaurus 180, the process determines if the term pair is known to be dissimilar. This is illustrated by optional step 387. If the term pair are known to be dissimilar they are not added to the user specific thesaurus 180.

Figure 4:
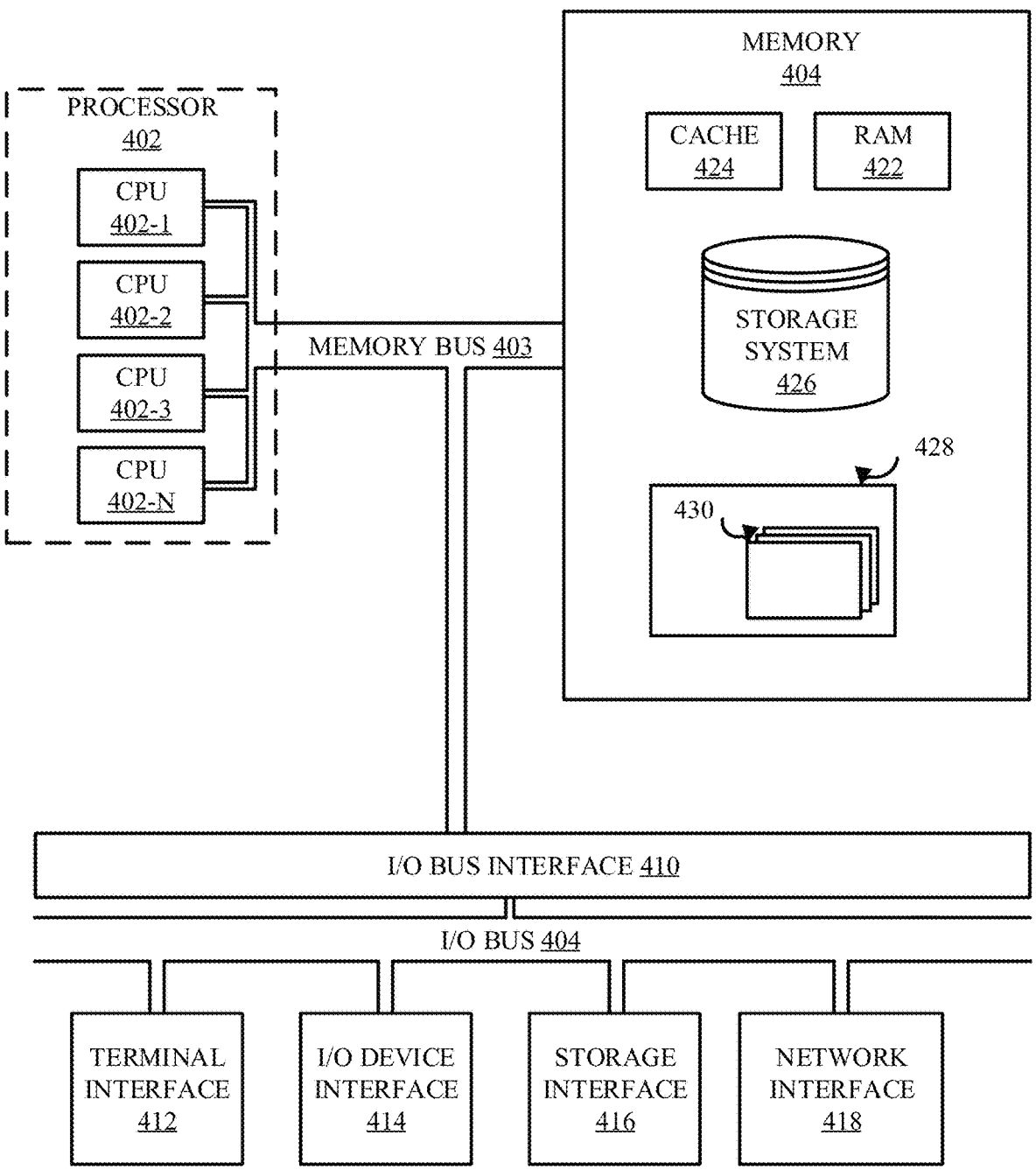
FIG. 4 is a block diagram illustrating a computing system according to one embodiment.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 310.

The computer system 401 may contain one or more general-purpose programmable central processing units (CPUs) 402-1, 402-2, 4023, 402-N, herein collectively referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
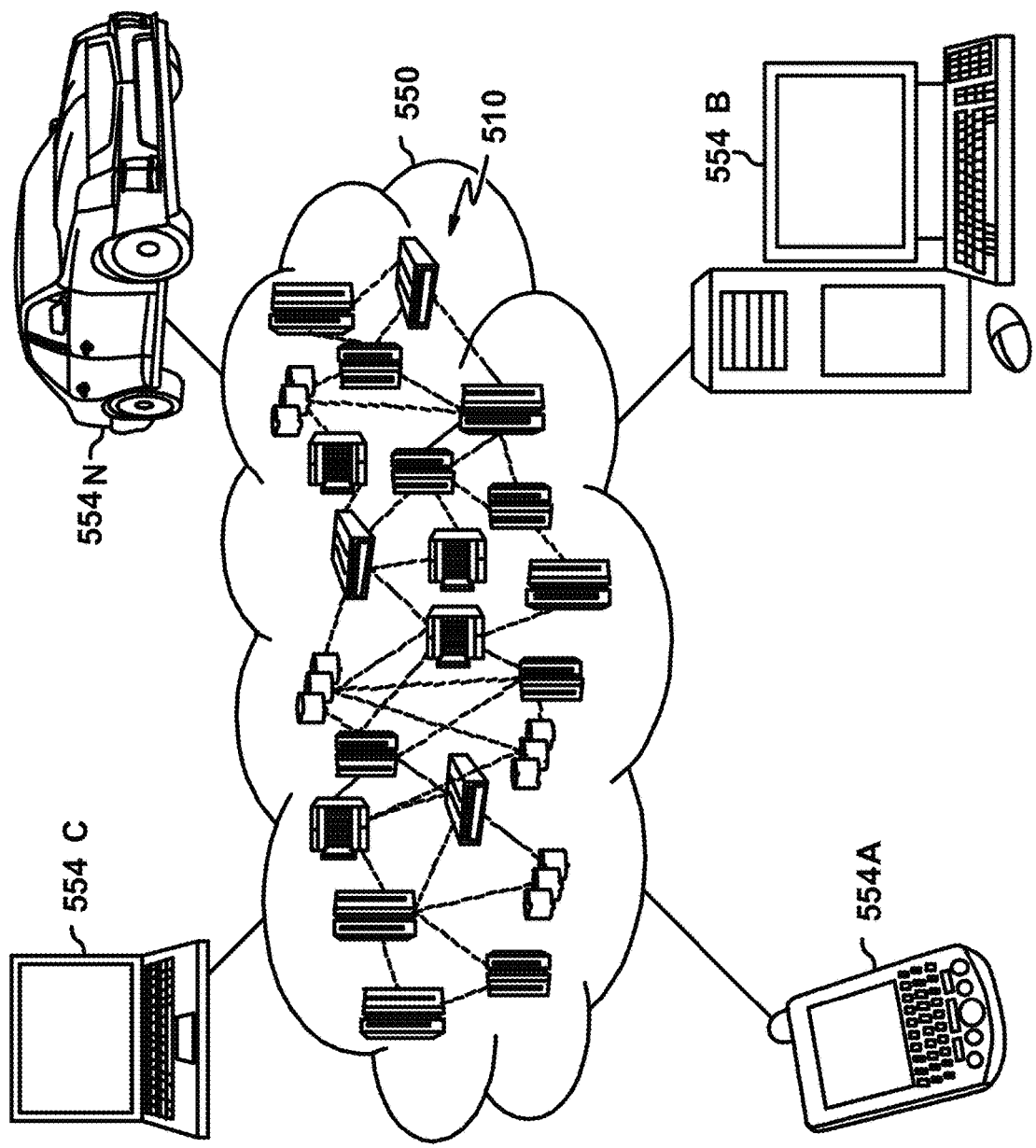
FIG. 5 is a diagrammatic representation of an illustrative cloud computing environment.

The system 500 may be employed in a cloud computing environment. FIG. 5, is a diagrammatic representation of an illustrative cloud computing environment 550 according to one embodiment. As shown, cloud computing environment 550 comprises one or more cloud computing nodes 595 with which local computing devices used by cloud consumers, such as, for example, personal digital assistant (PDA) or cellular telephone 554A, desktop computer 554B, laptop computer 554C, and/or automobile computer system 554N may communicate. Nodes 95 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 5 and cloud computing environment 550 may communicate with any type of computerized device over any type of network and/or network addressable connection (e.g., using a web browser).

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; layout detection 693; data analytics processing 694; transaction processing 695; and database 696.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for determining user synonyms in a query processing system, comprising:
   receiving a first query from a user of the query processing system;
   processing the first query through the query processing system;
   generating results for the first query;
   receiving a second query from the user;
   determining a contextual similarity between the first query and the second query;
   identifying a first term in the first query that is different from a second term in the second query, when the first query and the second query are determined to be contextually similar;
   determining that first term and the second term are not listed as synonyms in a thesaurus; and
   adding the first term and the second terms to the thesaurus as a user synonym.

2. The method of claim 1 further comprising:
   determining that the user is a serious user of the query processing system.

3. The method of claim 2 wherein a user is a serious user has had a predetermined number of interactions with the query processing system.

4. The method of claim 1 further comprising:
   determining that the second query was received within a threshold period of time after the first query; and
   logging the first query and the second query as a contiguous query session.

5. The method of claim 4 wherein the threshold period of time is based upon a time from when the user last viewed a result in the results.

6. The method of claim 1 further comprising:
   receiving a plurality of queries;
   determining the contextual similarity for each query in the plurality of queries;
   for each query in the plurality of queries determined to be contextually similar, identifying a third term in one of the queries that is different from a fourth term in a different query;
   determining that the third term and the fourth term are not listed as synonyms in the thesaurus; and
   adding the third term and the fourth term to the thesaurus as user synonyms.

7. The method of claim of 1 wherein determining the contextual similarity is determined based on a natural language comparison of the first query and the second query.

8. A computer readable storage medium having computer readable instructions that when executed by one or more computers causes the one or more computers to execute a method for determining user synonyms in a query processing system, comprising:
   receiving a first query from a user of the query processing system;
   processing the first query through the query processing system;
   generating results for the first query;
   receiving a second query from the user;
   determining a contextual similarity between the first query and the second query;
   identifying a first term in the first query that is different from a second term in the second query, when the first query and the second query are determined to be contextually similar;
   determining that first term and the second term are not listed as synonyms in a thesaurus; and
   adding the first term and the second terms to the thesaurus as a user synonym.

9. The computer readable storage medium of claim 8 further comprising:
   determining that the user is a serious user of the query processing system.

10. The computer readable storage medium of claim 9 wherein a user is a serious user has had a predetermined number of interactions with the query processing system.

11. The computer readable storage medium of claim 8 further comprising:
    determining that the second query was received within a threshold period of time after the first query; and
    logging the first query and the second query as a contiguous query session.

12. The computer readable storage medium of claim 8 further comprising:
    receiving a plurality of queries;
    determining the contextual similarity for each query in the plurality of queries;
    for each query in the plurality of queries determined to be contextually similar, identifying a third term in one of the queries that is different from a fourth term in a different query;
    determining that the third term and the fourth term are not listed as synonyms in the thesaurus; and
    adding the third term and the fourth term to the thesaurus as user synonyms.

13. A query processing system for determining user synonyms, comprising:
    at least one processor and at least one memory;
    a knowledge base having a plurality of documents and metadata configured to be queried;
    a query processor configured to receive a plurality of input queries, the plurality of input queries including at least a first input query and a second input query wherein the first query is processed prior to a receipt of the second query;
    a matching engine configured to match the plurality of queries with documents in the knowledge base to generate a plurality of results, wherein results from the first query are generated prior to the receipt of the second query;
    a ranking engine configures to score and rank the plurality of results
    a user identification component configured to identify specific users of the query processing system;
    a session identification component configured to identify contiguous query sessions for at least one user, wherein the first query and the second query are received during a contiguous query session; and
    a similarity detector configured to determine a contextual similarity between the first query and the second query, to determine a first term in the first query that is different from a second term in the second query, when the first query and the second query are determined to be contextually similar, and to add the first term and the second term to the thesaurus as a user synonym when the first term and the second term are not listed as synonyms in the thesaurus.

14. The system of claim 13 wherein the user identification component is configured to determine that a specific user is a serious user.

15. The system of claim 14 wherein the user identification component is configured to determine that the specific user is a serious user when the specific user has had a predetermined number of interactions with the query processing system.

16. The system of claim 14 wherein the threshold period of time is based upon a time from when the at least one user viewed a last one of the plurality of results.

17. The system of claim 13 wherein the session identification component identifies a contiguous query session when the first query and the second query are received within a threshold period of time.

18. The system of claim 13 wherein the similarity detector is further configured to determine if the first term and the second term are known to be dissimilar, and not to add the first term and the second term as synonyms to the thesaurus.

19. The system of claim 13 wherein the session identification component is further configured to store each query in an identified contiguous query session as a contiguous query session in a query store.

20. The system of claim 19 wherein the contiguous query session includes data indicating an order in which each query in the contiguous query session was entered.

\* \* \* \* \*